United States Patent Office 3,485,897
Patented Dec. 23, 1969

3,485,897
PHOSPHONIC ACID DIALKYL ESTER CONTAINING DIOLS
Herbert Jenkner, Cologne-Deutz, Germany, assignor to Chemische Fabrik Kalk GmbH, Cologne-Kalk, Germany
No Drawing. Continuation-in-part of application Ser. No. 509,221, Nov. 22, 1965. This application Apr. 29, 1968, Ser. No. 725,184
Claims priority, application Germany, Oct. 3, 1964, C 34,020; Nov. 24, 1964, C 34,450
Int. Cl. C07f 9/40; C08k 1/60
U.S. Cl. 260—932     6 Claims

ABSTRACT OF THE DISCLOSURE

Diols of the formula

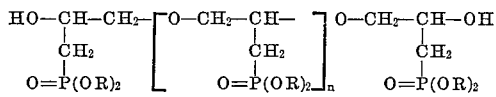

wherein R is selected from the group consisting of alkyl, bromine substituted alkyl and chlorine substituted alkyl of up to 10 carbon atoms and $n$ is an integer of from 0 to about 20, preferably, 2 to 5, which are useful in reducing the combustible plastics and their preparation by reacting compounds of the formula

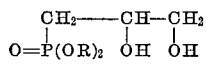

with compounds of the formula

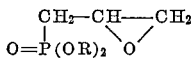

in a molar ratio of about 1:1 to 1:21 in the presence of a Friedel-Crafts catalyst.

RELATED APPLICATIONS

This application is a continuation-in-part of copending application Ser. No. 509,221, filed Nov. 22, 1965 now abandoned, which in turn is a continuation-in-part of copending application Ser. No. 479,669, filed Aug. 13, 1965.

DESCRIPTION OF THE INVENTION INCLUDING PREFERRED EMBODIMENTS

The present invention relates to novel phosphorus containing diols of the formula:

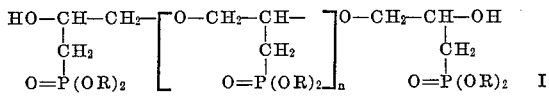

in which R represents the same or different saturated aliphatic hydrocarbon radicals or chlorine or bromine substituted saturated aliphatic hydrocarbon radicals and $n$ is an integer from 0 to 20, preferably, 2 to 5, and a process for their preparation.

The invention also encompasses the equivalent isomeric products resulting from inversion of any of the individual

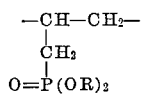

radicals. For sake of simplicity, however, the above formula will only be used to illustrate the structure of the isomeric products of the present invention.

It is known that dihydroxy alkyl phosphonic acid dialkyl esters can be produced by hydrolysis of epoxy alkyl phosphonic acid dialkyl esters. The starting epoxy alkyl phosphonic acid dialkyl esters are prepared by reaction of equimolar quantities of trialkyl phosphites and epibromohydrin or epichlorohydrin.

It was found that the dihydroxy alkyl phosphonic acid dialkyl esters can be used to reduce the combustibility of combustible plastics. Tests have shown, however, that the mechanical and physical properties of plastics containing such esters would be more advantageous if these esters would have a larger sized molecule and a higher phosphorus content. As a consequence, possibilities were investigated for the production of compounds fulfilling these requirements.

According to the invention it was found that this could be accomplished by reacting dihydroxy alkyl phosphonic acid dialkyl or di-haloalkyl esters of the formula

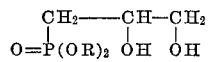

with epoxy alkyl phosphonic acid, dialkyl or di-haloalkyl esters of the formula

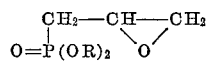

in molar ratios of 1:1 to about 1:21 and, preferably, in molar ratios of 1:3 to 1:6, in the presence of small quantities of Friedel-Crafts catalysts while passing an inert gas through the reaction mixture at temperatures between 40 and 120° C., preferably, between 60 and 100° C.

The triesters of phosphorous acid which come into consideration as starting materials for the production of the dihydroxy alkyl phosphonic acid dialkyl esters or dihaloalkyl esters employed in the process according to the invention, are those derived from alkanols or chloro or bromo substituted alkanols. Preferably, for large scale commercial production, the triesters of phosphorous acid are derived from alcohols containing 1 to 6 carbon atoms. Such triesters, for instance, can be: trimethyl-, triethyl-, tripropyl-, triisopropyl-, tributyl-, triisobutyl-, tris-(bromoethyl)-, tris-(chloroethyl)-, tris-(dibromoethyl)- and chloroethyldiethyl-phosphites. However, it is also possible to use triesters of phosphorous acid with higher alcohols, such as, for example, trioctyl-, trinonyl- and tridecyl-phosphites.

As is known, the phosphorus containing epoxy compounds of Formula III can be obtained by reacting the triesters of phosphorous acid with epihalohydrins, especially epichloro- or epibromohydrin, with simultaneous production of a corresponding quantity of alkyl halide. Also, as is known, the compounds of Formula III can be hydrolysed with acids or with water alone at elevated temperatures to produce the corresponding dihydroxy compounds of Formula II. For purposes of the present invention it can, however, be advantageous only to hydrolyse a portion of the epoxy compounds of Formula III so that a mixture of compounds of Formulas II and III is obtained directly although it is of no detriment if the dihydroxy compounds of Formula II are formed separately and are isolated before admixture with further quantities of epoxy compounds of Formula III.

The quantities of the dihydroxy compound of Formula II and of the epoxy compound of Formula III which are reacted according to the invention depend upon the size of molecule desired in the product, namely, the diol of Formula I. For technical purposes, the molar ratio of compounds II:III should be between 1:1 to about 1:21.

An inert gas, such as, nitrogen, is passed through the reaction mixture during the entire reaction between compons II and III. If the stream of such gas is sufficiently strong it will also suffice for the thorough mixing of the reaction mixture necessary during the later stages of the reaction. In most instances, however, it will be found advantageous to effect intensive mixture of the reaction mixture by other means than the gas introduced therein, such as, for example, with stirrers.

Small quantities of the catalyst, which is active in the synthesis of benzene homologues according to Friedel-Crafts, for example, aluminum chloride, aluminum bromide, boron trifluoride, boron trichloride, titanium tetrachloride, zinc dichloride or their etherates, are added to the prepared reaction mixture and the reaction initiated at a temperature between 40 and 120° C., preferably, between 60 and 100° C., such temperature being maintained during the reaction. The quantity of catalyst required is easily ascertained for the case at hand by simple preliminary tests. As a guide, it is expedient to start with about 0.025 mol of catalyst per g-atom of phosphorus contained in the reaction mixture.

After the reaction has been completed the catalyst is destroyed, most expediently by addition of a sufficient quantity of alcoholic NaOH or KOH to the reaction products. Suitably 2-5 mol of alkali metal hydroxide are used per mol of catalyst. Subsequently the volatile components are removed from the reaction mixture by vacuum distillation. The desired product of Formula I is essentially the residue of such distillation. The compounds of Formula I are straw yellow viscous liquids. The distillation residue in most instances is of sufficient purity for use as fire retarding agents in plastics. When higher purity requirements must be made, the product can be dissolved in tetrahydrofurane, dioxane, ether or other suitable solvents and the solution treated with active carbon and filtered. Upon distilling off the solvent from the filtrate after one treatment with active carbon, the compounds of Formula I are recovered as weakly yellow viscous liquids.

The following examples will serve to illustrate the invention. In such examples the quantities are given in parts by weight unless otherwise specified.

EXAMPLE 1

(a) Production of the epoxy alkyl phosphonic acid dialkyl ester 498 parts of triethyl phosphite were mixed with 822 parts of epibromohydrin and the mixture heated to 98–100° C. for 8–12 hours while stirring and passing nitrogen therethrough. During this period 327 parts of ethyl bromide distilled off. After completion of the reaction the excess epibromohydrin (403 parts) was distilled off from the reaction mixture. 538 parts or 92.5% of theory of epoxy propyl phosphonic acid diethyl ester with a phosphorus content of 16 weight percent and a molecular weight of 200 determined by freezing point depression in benzene (calculated 194) were obtained as the residue.

(b) Production of dihydroxyalkyl phosphonic acid dialkyl ester 194 parts of the epoxy propyl phosphonic acid diethyl ester, produced as above, were slowly introduced into 200 parts of a 1% $H_2SO_4$ which was heated to about 50° C.

After the hydrolysis had been completed, 48 parts of a 10% NaOH solution were added to effect neutralization. The sodium sulfate which precipitated was filtered off and the filtrate boiled down under vacuum. 203 parts or 96% of theory of dihydroxy propyl phosphonic acid diethyl ester with a phosphorus content of 15.6 weight percent, a hydroxy number of 317 and an epoxy number of 0 were obtained as residue.

(c) Production of the phosphorus containing diol 43 parts of dihydroxy propyl phosphonic acid diethyl ester were mixed with 117 parts of epoxy propyl phosphonic acid diethyl ester (molar ratio about 1:3) and with 3 parts of boron trifluoride etherate. This mixture was heated for 2 hours at 80° C. while passing a stream of nitrogen therethrough. After the reaction mixture had cooled down, 17 parts of a 10% solution of NaOH in methanol were added thereto, the reaction mixture filtered and the volatile portions distilled off from the filtrate.

155 parts (about 97% of theory) of a straw yellow viscous liquid with a phosphorus content of 16.4 weight percent, a hydroxy number of 49 and an epoxy number of 0 remained as distillation residue.

Upon the basis of analytic investigations the product was of the formula

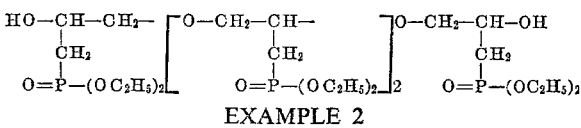

EXAMPLE 2

28 parts of 2,3-dihydroxy propyl-phosphonic acid-bis-(2-chloroethyl)-ester (prepared in a manner analogous to the preparation of the dihydroxy alkyl phosphonic acid diethyl ester of Example 1 using tris-(chloroethyl)phosphite instead of triethyl phosphite) were mixed with 263 parts of epoxy-propyl-phosphonic acid-bis-(2-chloroethyl)-ester (molar ratio about 1:10) and 3 parts aluminum chloride and the mixture heated for 5 hours at 80° C. while passing a stream of nitrogen therethrough. After cooling down the mixture was neutralized with methanolic 20% NaOH and the volatile components of the mixture distilled off under vacuum. 291 parts of viscous liquid with a chlorine content of 26.8% and a hydroxy number of 38 remained as the distillation residue.

EXAMPLE 3

212 parts of 2,3-dihydroxy-propyl-phosphonic acid-diethyl-ester were mixed with 194 parts of epoxy-propyl-phosphonic acid-diethyl-ester (molar ratio 1:1) and 2 parts of boron-trifluoride-etherate and the mixture heated for 2 hours at 90° C. while passing a current of nitrogen therethrough. After cooling the mixture was neutralized and the volatile components distilled off as described above. 406 parts of a viscous liquid containing 15.25% of phosphorus and having a hydroxy number of 276 remained as the distillation residue.

EXAMPLE 4

21.2 parts of 2,3-dihydroxy-propyl-phosphonic acid-diethyl-ester were mixed with 388 parts of epoxy-propyl-phosphonic acid-diethyl-ester (molar ratio 1:20) and 4 parts of boron-trifluoride-etherate and the mixture heated for 2 hours at 90° C. while passing a stream of nitrogen therethrough. After cooling the reaction mixture was neutralized and the volatile compounds distilled off as described above. 409 parts of a viscous liquid containing 15.9% of phosphorus and having a hydroxy number of 27 remained as the distillation residue.

I claim:

1. A phosphorus-containing diol of the formula

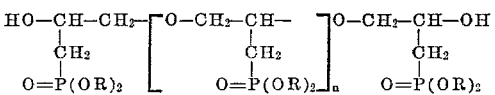

wherein R is selected from the group consisting of alkyl, bromine substituted alkyl and chlorine substituted alkyl of up to 10 carbon atoms and $n$ is an integer of from 0 to about 20.

2. A diol according to claim 1 in which $n$ is an integer from 2 to 5.

3. A diol according to claim 1 in which $n=2$ and R is ethyl.

4. A diol according to claim 1 wherein $n=9$ and R is chloroethyl.

5. A diol according to claim 1 wherein $n=0$ and R is ethyl.

6. A diol according to claim 1 wherein $n=19$ and R is ethyl.

References Cited

UNITED STATES PATENTS

| 3,141,901 | 7/1964 | Petersen et al. | 260—968 XR |
| 3,162,667 | 12/1964 | Reed et al. | 260—968 XR |
| 3,201,439 | 8/1965 | Petersen et al. | 260—968 XR |
| 3,256,193 | 6/1966 | Petersen et al. | 260—953 XR |

CHARLES B. PARKER, Primary Examiner

A. H. SUTTO, Assistant Examiner

U.S. Cl. X.R.

260—45.95, 348, 968